2,954,660
Patented Oct. 4, 1960

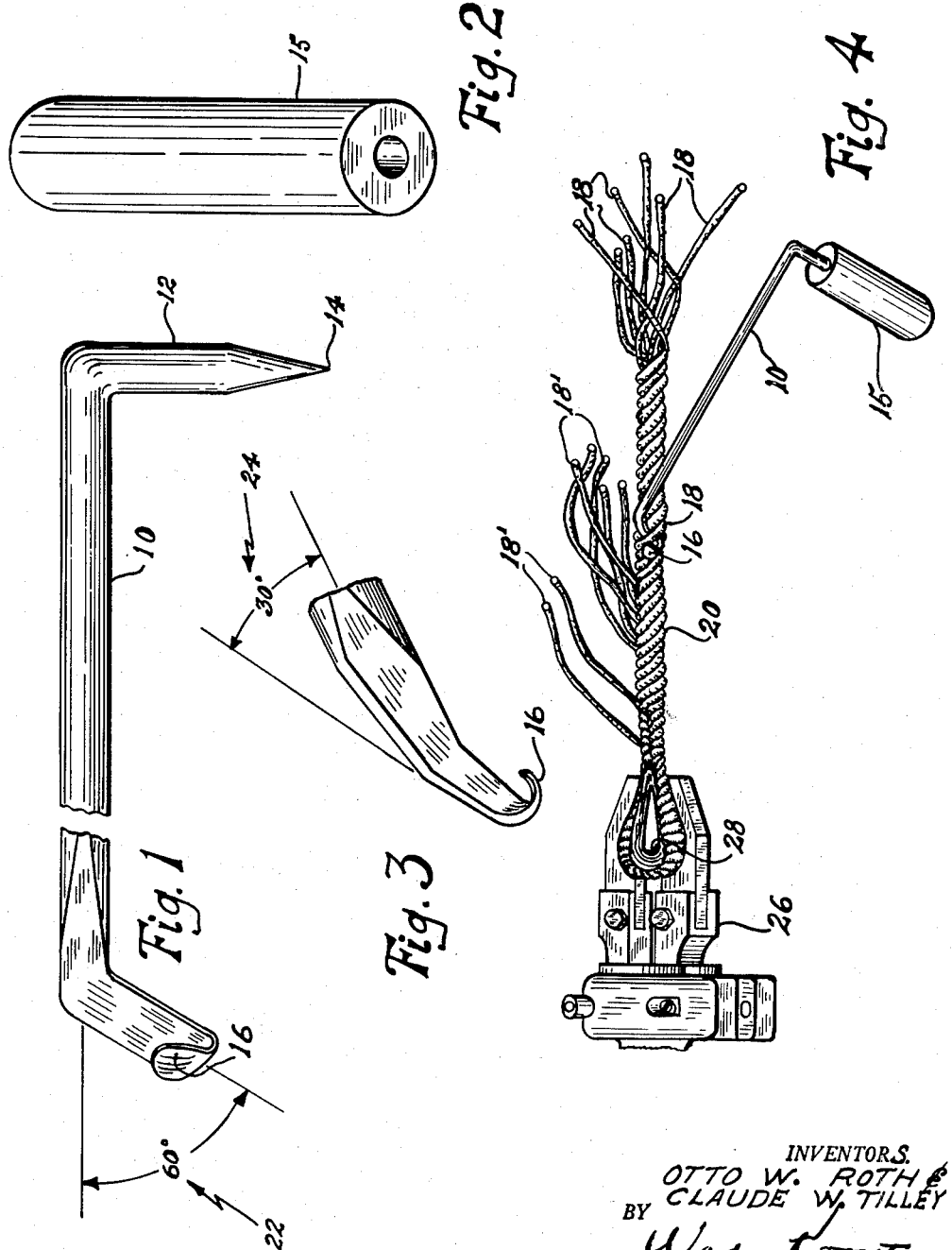

2,954,660

PICK STRAND CABLE SPLICING TOOL

Otto W. Roth, Star Rte. 1, Box 25H, Littlerock, Calif., and Claude W. Tilley, Thunderbird Trailer Park, Rosamond, Calif.

Filed Sept. 25, 1959, Ser. No. 842,543

3 Claims. (Cl. 57—23)

(Granted under Title 35, U.S. Code (1952), sec. 266)

The invention described herein may be manufactured and used by or for the United States Government for governmental purposes without payment to us of any royalty thereon.

This invention relates to a cable splicing tool and is designed to replace the common marline-spike, and known variations thereof, for splicing rope or stranded wire cable. It is especially useful in splicing cable used in and around airfields and on airplanes.

The common marline-spike, traditionally used by sailors, consists of a pointed iron rod which is forced under a strand of cable or rope, the strand is raised, the cable twisted to maintain the raised condition and the loose end threaded or pulled under the lifted strand. This disturbs the twist of the cable, is apt to damage fibres of the rope or individual wires of the cable, and results in an inferior splice. It is also fatiguing to the operator resulting in a loss of time in making a splice. It is especially difficult if the rope or cable is tightly twisted, since there is nothing to maintain the raised condition of the lifted strand to permit threading through the strand of the connecting rope.

There are several tools which have been devised to overcome the shortcomings of the marline-spike, some of them employing an eye or threading device to pull the loose end through the raised strand. Some of these devices are complicated and consist of several parts which may be misplaced or lost, and are expensive to manufacture. All of them raise the strand by forcing a pointed rod through the rope or cable and are therefore subject to most of the objections found in the use of the simple marline-spike.

It is an object of this invention to provide a simple, one piece tool, which is inexpensive to manufacture, easy to use, and overcomes the objections to the marline-spike and the tools which have been devised to replace it.

It is a further object to provide a tool which will operate efficiently, with less fatigue to the operator and with less damage to the cable or its strands or fibres.

It is also an object to provide a tool which will give a stronger splice and retain the original twist in the cable.

It is still a further object to provide a splicing tool which will enable an operator to make splices quickly and easily.

The above and still other objects, advantages and features of our invention will become apparent upon consideration of the following detailed description of one embodiment thereof, especially when taken in conjunction with the accompanying drawings, in which:

Fig. 1 is a plan view looking down on the tool;

Fig. 2 is an isometric view showing a handle cover to slip over the pointed end of the tool shown in Fig. 1;

Fig. 3 is a plan view showing the detail of the lip formed on the end of the tool shown in Fig. 1; and Fig. 4 is illustrative of the way our device is used.

In the drawings the numeral 10 represents a rod or bar of any suitable metal, preferably tool steel, with one end bent at right angles to form a handle 12. The end of the handle may be sharpened to a point 14 to serve as a marline-spike if required and a handle cover 15 shown in Fig. 2 is provided to cover the point 14. The other end of the rod 10 is tapered on both sides from the full diameter of the rod to approximately one thirty second of an inch thick, forming at the end a lip 16. The lip 16 is formed with a radius to fit the outside diameter of the strands 18, of a cable 20, to be spliced. The portion of the tapered end of the tool terminating in the lip 16 is bent at an angle of approximately 60° from a line running through the length of the tool 10 as is shown at 22 in Fig. 1. This angle, and the angle shown at 24, are provided to enable the operator to manipulate the tool with a simple clockwise motion of the wrist and forearm and at the same time keep the handle of the tool and the hand of the operator free of the cable being spliced. The portion of the tool containing the lip is offset from a plane through the tool 10 and the bent portion forming the handle 12 by an angle of approximately 30° as shown at 24 in Fig. 3. This angle of 30° of the lip portion at 24 combined with the offset of 60° as shown at 22 furthers the ease with which the lip 16 is inserted under a strand, as shown in Fig. 4. It also contributes to normal flexure of the wrist and forearm in raising a strand preparatory to insertion of a loose end. Fig. 4 illustrates the use of the tool. The lip 16 is shown inserted under a strand 18 of a cable 20. By turning the handle 15 to the right in a clockwise direction the strand 18 is lifted but due to the thinness of the lifting lip 16 the twist of the cable is disturbed a minimum amount. A loose strand 18' is then placed in the curved lip 16 and the handle rotated to the left in a counterclockwise direction and the loose strand 18' is threaded under the raised strand 18 of the cable 20.

Also illustrated in Fig. 4 is a clamping device 26 shown holding a thimble 28 in the cable 20 to form an eye when the splicing is completed.

As can be seen from the description of the tool and its use it has many advantages over a marline-spike or any known substitute therefor. The thinness of the blade used in raising a strand disturbs the twist of a cable very little, the fibres of a rope or the individual wires of a metal cable are not injured by raising the strand and the ease with which it is used eliminates fatigue of the operator and makes splicing faster.

All of these advantages result in a better and stronger splice and are provided in a simple one piece tool.

Although the invention has been described with reference to a particular embodiment, it will be understood to those skilled in the art that the invention is capable of a variety of alternative embodiments within the spirit and scope of the appended claims.

What we claim is:

1. A splicing tool for rope or wire cable comprising a metal rod, one end of said rod bent at an angle to form a handle, the other end of said rod having a taper on two opposite sides from the full diameter of said rod to a substantially flat surface, a portion of said tapered end bent at an angle to the said rod, the tip of said flattened portion of said rod being bent to form a lip on a radius to accommodate a strand of cable to be spliced, said flattened portion of said rod containing said tip being offset from said rod by an angle to a plane passing through said rod and the said handle.

2. A splicing tool for rope or wire cable comprising a metal rod, one end of said rod bent at an angle to form a handle, the other end of said rod having a taper on two opposite sides from the full diameter of said rod to a substantially flat surface, a portion of said tapered end bent at an angle of about 60° to the said rod, the tip of said flattened portion of said rod being bent to form a lip on a radius to accommodate a strand of cable to be spliced, said flattened portion of said rod containing said tip being offset from said rod by an angle of approximately 30° to a plane passing through said rod and the said handle.

3. A splicing tool for rope or wire cable comprising a metal rod, one end of said rod being bent at an angle of 90° to form a handle, the other end of said rod having a taper on two opposite sides from the full diameter of said rod to form a substantially flat surface, said tapered sides lying in a plane running through the said handle and said rod, a portion of said tapered end being bent at an angle of approximately 60° to the said rod, the tip of said flattened portion being bent on a radius to accommodate a strand of cable to be spliced, the portion of said flattened end containing said tip being bent up from a plane passing through said handle and said rod at an angle of approximately 30°.

References Cited in the file of this patent

UNITED STATES PATENTS

| | | |
|---|---|---|
| 961,201 | Altheide | June 14, 1910 |
| 2,417,055 | Borgelt | Mar. 11, 1947 |

FOREIGN PATENTS

| | | |
|---|---|---|
| 48,513 | Sweden | Feb. 9, 1921 |